(12) United States Patent
Wu

(10) Patent No.: US 6,401,601 B1
(45) Date of Patent: Jun. 11, 2002

(54) GRILL DEVICE HAVING TWO INDEPENDENTLY CONTROLLABLE COOKING SETS

(75) Inventor: Tsan-Kuen Wu, Tainan Hsien (TW)

(73) Assignee: Tsann Kuen USA Inc., Pasadena, CA (US)

(*) Notice: Subject to any disclaimer, the term of this patent is extended or adjusted under 35 U.S.C. 154(b) by 0 days.

(21) Appl. No.: 09/960,577

(22) Filed: Sep. 20, 2001

(51) Int. Cl.[7] ................ A47J 37/00; A47J 37/06; A47J 37/08; A23L 1/00
(52) U.S. Cl. ................ 99/331; 99/349; 99/372; 99/374; 99/378; 99/400; 99/445; 99/446
(58) Field of Search ................ 99/400, 331, 401, 99/332, 372–384, 425, 444–450; 219/401, 524, 585, 525, 537, 521, 415, 386, 461, 492, 494; 126/369, 20; 100/92, 305; 426/523, 520, 512

(56) References Cited

U.S. PATENT DOCUMENTS

| | | | | |
|---|---|---|---|---|
| 3,948,159 A | * | 4/1976 | Vigerstrom | 99/358 |
| 4,483,239 A | * | 11/1984 | Mueller et al. | 99/349 X |
| 4,987,827 A | * | 1/1991 | Marquez | 99/331 |
| 5,363,748 A | * | 11/1994 | Boehm et al. | 99/372 |
| 6,016,743 A | * | 1/2000 | Glavan | 99/349 |
| 6,257,126 B1 | * | 7/2001 | Veljkovic et al. | 99/349 |
| 6,263,786 B1 | * | 7/2001 | Raoi et al. | 99/349 |

* cited by examiner

Primary Examiner—Timothy F. Simone
(74) Attorney, Agent, or Firm—Brinks Hofer Gilson & Lione

(57) ABSTRACT

A grill device includes two independently controllable cooking sets confining two isolated cooking spaces such that two different meat pieces can be grilled therein under different cooking temperatures at the same time.

4 Claims, 5 Drawing Sheets

GRILL DEVICE HAVING TWO INDEPENDENTLY CONTROLLABLE COOKING SETS

BACKGROUND OF THE INVENTION

1. Field of the Invention

The invention relates to a grill device, more particularly to a grill device which has two independently controllable cooking sets.

2. Description of the Related Art

A conventional grill device includes a lower grill unit with a lower cooking member, an upper grill unit which is pivotally connected to the lower grill unit and which has an upper cooking member electrically coupled to the lower cooking member, and a control switch for controlling actuation and cooking temperature of the upper and lower cooking members. Some disadvantages encountered during use of the aforesaid conventional grill device are as follows:

1. In case two different meat pieces are grilled between a cooking space that is confined by the upper and lower cooking members under a controlled cooking temperature, over grilling of one of the meat pieces can result by virtue of different required cooking temperatures for the meat pieces.

2. Since the different meat pieces are not properly isolated from each other during grilling, the tastes of the meat pieces are likely to mix together.

3. In addition, the upper grill unit is formed as a single-piece. As such, half of the upper grill unit cannot be opened relative to the lower grill unit in order to fetch one of the meat pieces in case cooking of the latter is done.

SUMMARY OF THE INVENTION

The object of this invention is to provide a grill device with an upper grill unit that is formed as two independent upper halves having independently controllable cooking members that can eliminate the occurrence of the aforesaid disadvantages which result during use of the conventional grill device.

Accordingly, a grill device of the present invention includes a horizontal single-piece lower grill unit, a horizontal upper grill unit, a connecting unit, and a pair of control switches. The lower grill unit has a rear side and is provided with two lower cooking members. The upper grill unit is in the form of two independent upper halves which are superposed on the lower grill unit so as to dispose each of the upper halves at a closed position with respect to the lower grill unit. Each of the upper halves is provided with an upper cooking member which is registered with and which is electrically coupled to a respective one of the lower cooking members of the lower grill unit. The connecting unit includes an intermediate pivot seat which is fixed on and which extends upwardly from the rear side of the lower grill unit, and a pair of spaced apart left and right pivot seats which are fixed on the rear side of the lower grill unit and which are respectively spaced apart from two opposite sides of the intermediate pivot seat. Each of the upper halves is pivoted to a respective one of the pivot seats and a respective one of the opposite sides of the intermediate pivot seat. Each of the control switches is operable so as to control actuation and cooking temperature of a respective one of the lower cooking members of the lower grill unit and the upper cooking member of a corresponding one of the upper halves.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
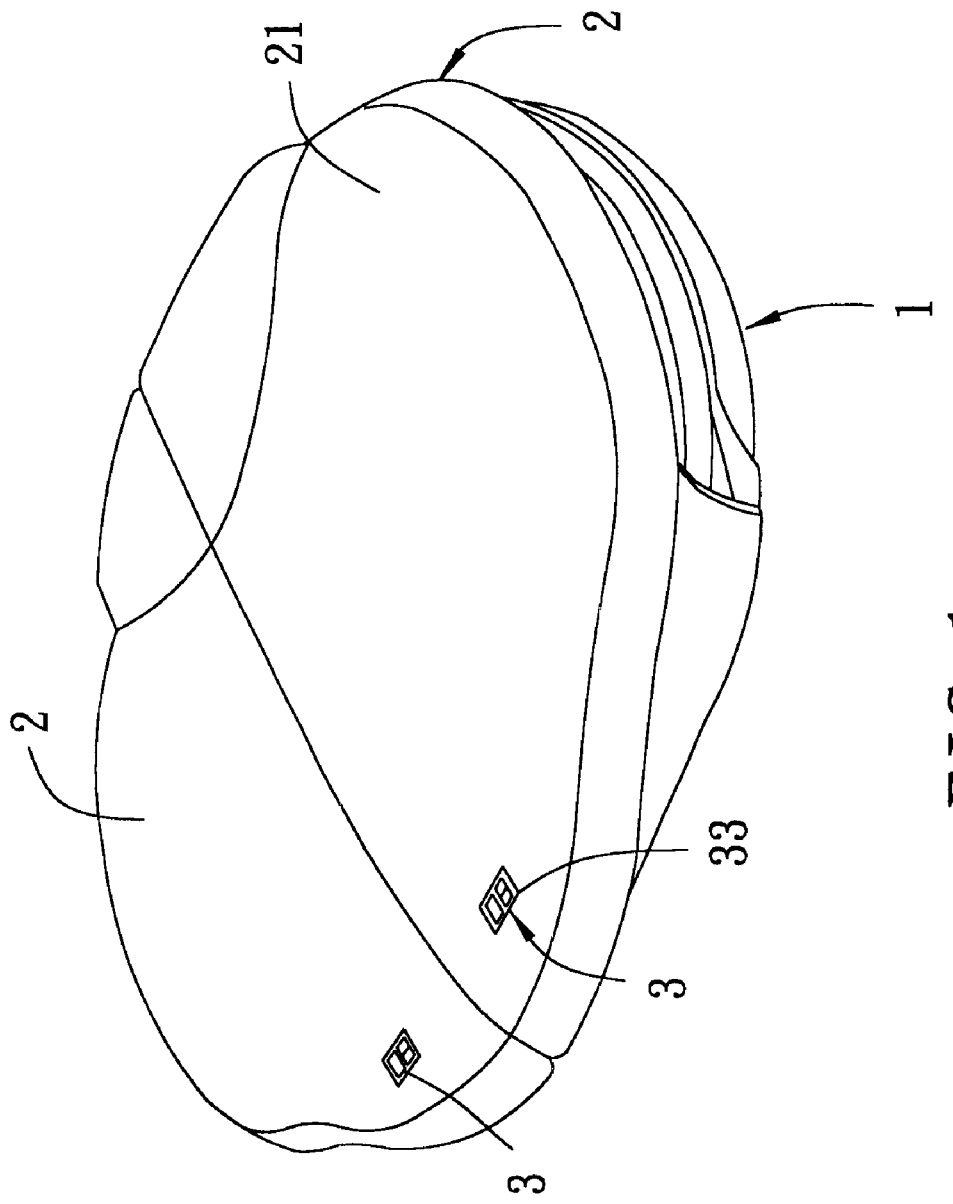
FIG. 1 is a perspective top view of the preferred embodiment of a grill device of the present invention at a closed position.
Figure 2:
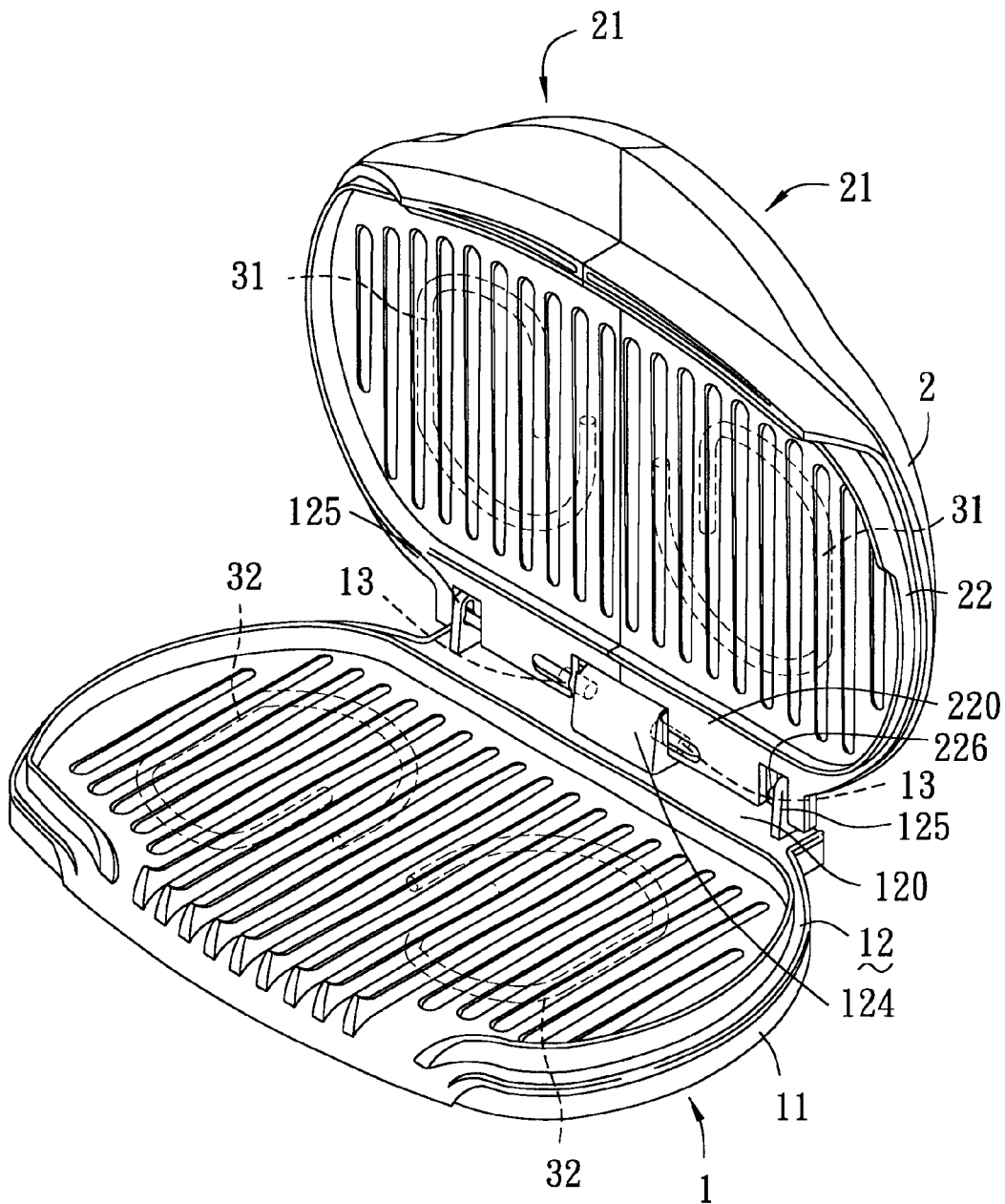
FIG. 2 is a perspective view of the preferred embodiment at a half-open position.
Figure 3:
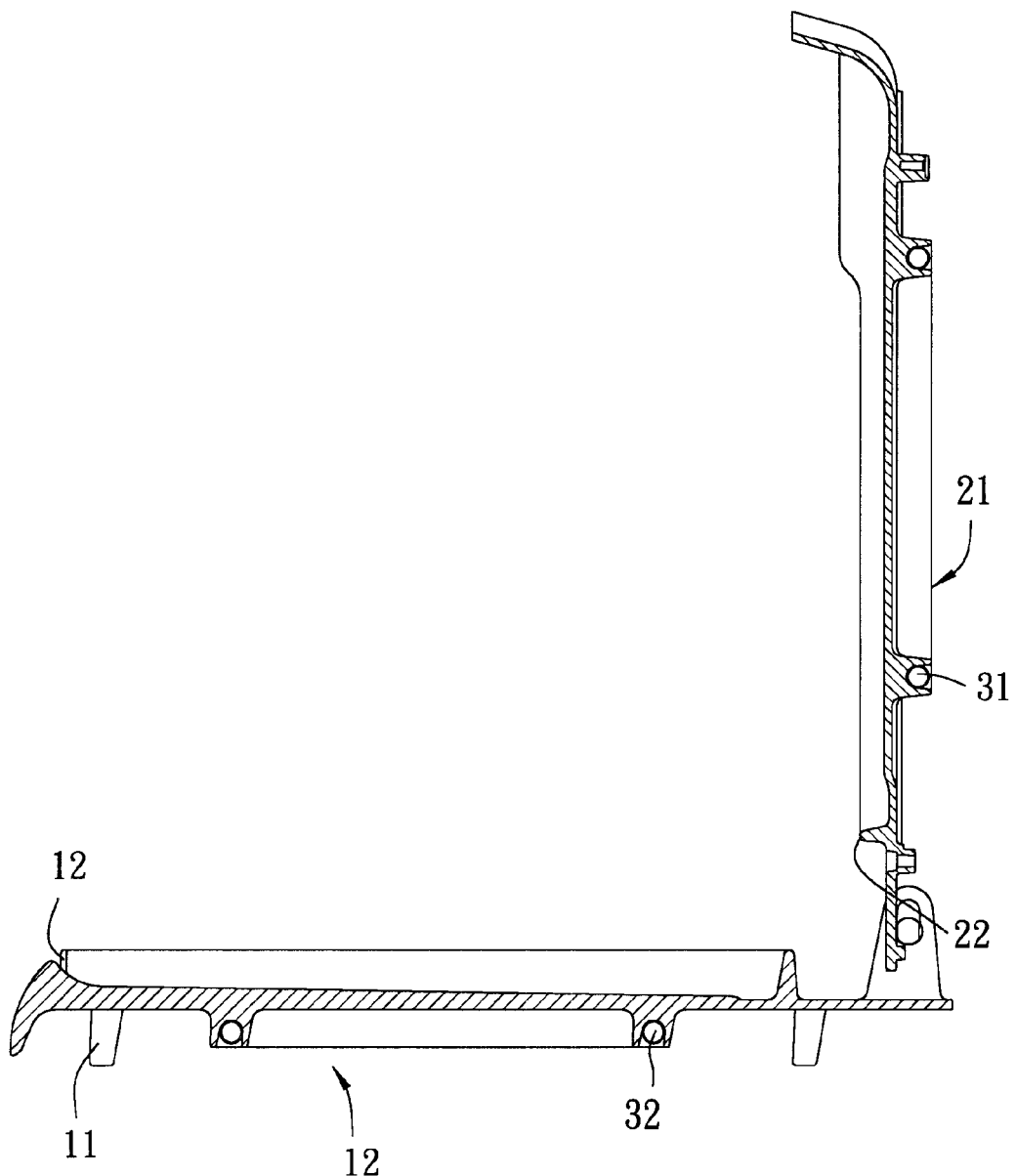
FIG. 3 is a lateral sectional side view of the preferred embodiment, illustrating how upper and lower cooking members are mounted on upper and lower grill units.
Figure 4:
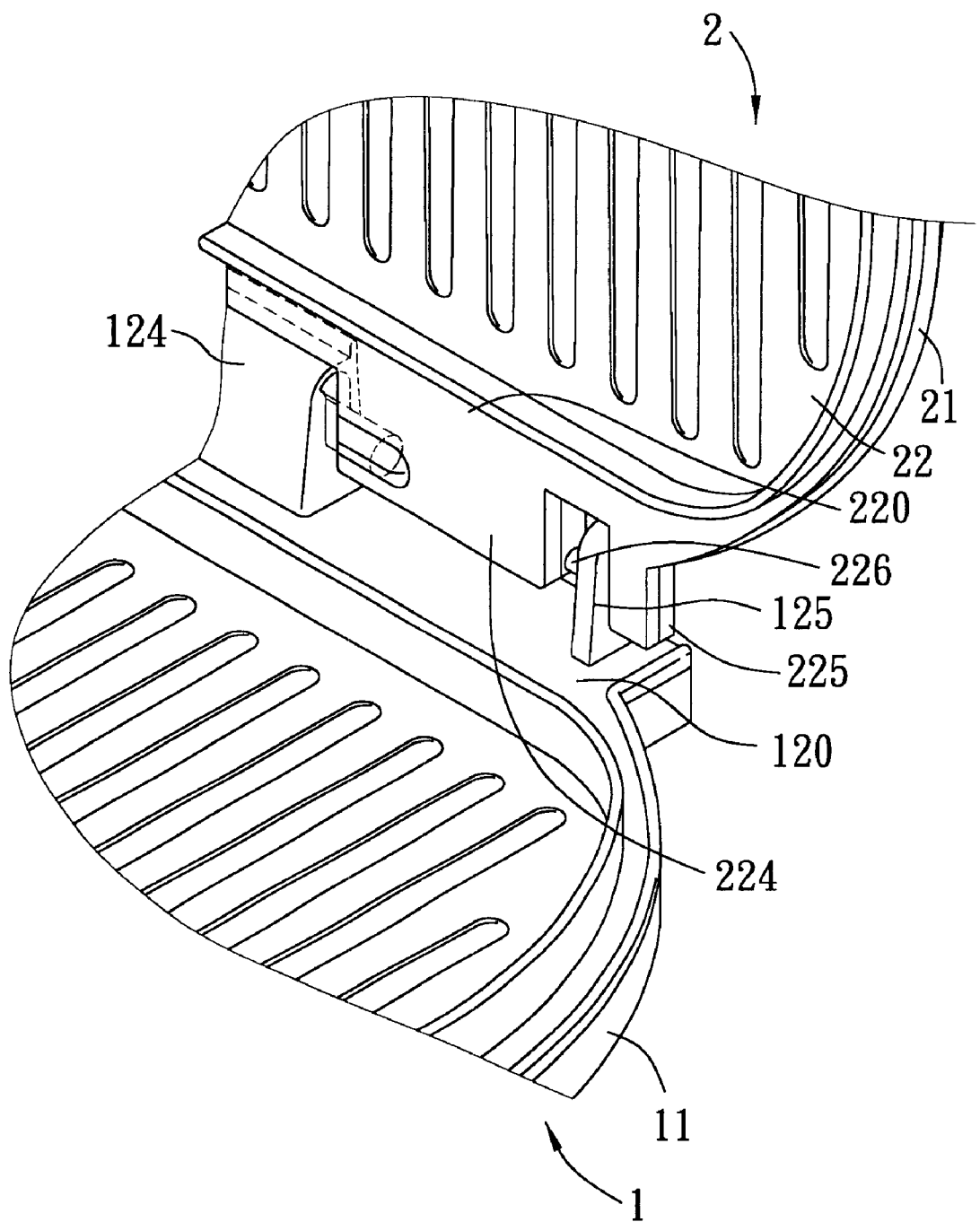
FIG. 4 is a fragmentary perspective view of the preferred embodiment, illustrating how the upper grill unit is pivotally connected to the lower grill unit.

Referring to FIGS. 1 to 4, the preferred embodiment of a grill device of the present invention is shown to include a horizontal single-piece lower grill unit 1 with a rear side 120, a horizontal upper grill unit 2 with a rear side 220, a connecting unit, and a pair of control switches 3.

As illustrated, the lower grill unit 1 has a base 11, and a top 12 that is provided with two lower cooking members 32.

The upper grill unit 2 includes two independent upper halves 21, each of which is superposed on the lower grill unit 1 so as to dispose each of the upper halves 21 at a closed position with respect to the lower grill unit 1, as best shown in FIG. 1. Each of the upper halves 21 has a bottom 22 that is provided with an upper cooking member 31 which is registered with and which is electrically coupled to a respective one of the lower cooking members 32 of the lower grill unit 1.

The connecting unit includes an intermediate pivot seat 124, and a pair of aligned left and right pivot seats 125. The intermediate pivot seat 124 is fixed on and extends upwardly from the rear side 120 of the lower grill unit 1. The left and right pivot seats 125 are fixed on the rear side 120 of the lower grill unit 1 and are respectively spaced apart from two opposite sides of the intermediate pivot seat 124. The rear side 220 of each of the upper halves 21 has two spaced apart pieces 224,225 from which aligned left and right pivots 13, 226 extend outwardly and laterally into slots that are formed in the pivot seats 125 and in the opposite sides of the intermediate pivot seat 124. The slots in the intermediate pivot seat 124 and the left and right pivot seats 125 are dimensioned to permit raising of the upper halves 21 relative to the lower grill unit 1 by virtue of a piece of meat (not shown) that is confined between the upper halves 21 and the lower grill units 1. Since the particular connection between the upper halves 21 and the lower grill unit 1 is not pertinent to the claimed invention, a detailed structure of the same is omitted herein for the sake of brevity.

Each of the control switches 3 is operable in a known manner so as to control actuation and cooking temperature of a respective one of the lower cooking members 32 of the lower grill unit 1 and the upper cooking member 31 of a corresponding one of the upper halves 21. In this embodiment, the control switches 3 are mounted on the upper halves 21, respectively, and are respectively provided with a temperature control knob 33.

Figure 5:
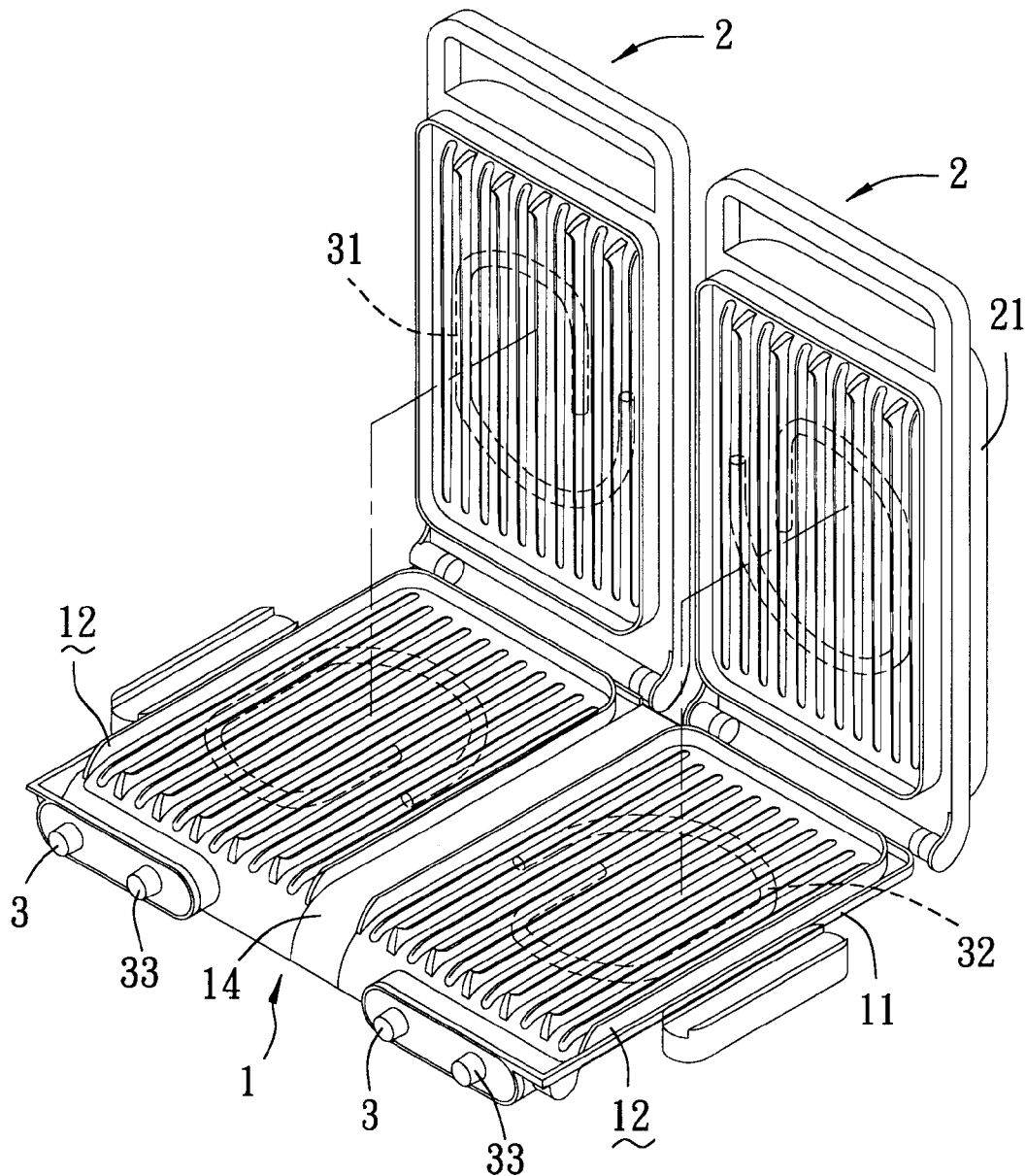
FIG. 5 is a perspective view of a modified preferred embodiment at the half-open position.

Referring to FIG. 5, a modified preferred embodiment of the present invention is shown to have a structure generally similar to the previous embodiment. The main difference resides in that an insulator spacer 14 is disposed between the lower cooking members 32 so as to form two isolated cooking spaces that are confined by the upper halves 21 and the lower cooking members 32. In this embodiment, the control switches 3 are mounted on the lower grill unit 1 at two sides of the insulator spacer 14.

With this invention thus explained, it is apparent that numerous modifications and variations can be made without departing from the scope and spirit of this invention. It is therefore intended that this invention be limited only as indicated in the appended claims.

I claim:

1. A grill device comprising:

a horizontal single-piece lower grill unit having a rear side and provided with two lower cooking members;

a horizontal upper grill unit in the form of two independent upper halves superposed on said lower grill unit so as to dispose each of said upper halves at a closed position with respect to said lower grill unit, each of said upper halves having a rear side and an upper cooking member which is registered with and which is electrically coupled to a respective one of said lower cooking members of said lower grill unit;

a connecting unit interconnecting said rear sides of said upper grill unit and said upper halves in such a manner that each of said upper halves can be turned rearward from said closed position to an open position, in which a respective one of said upper halves is generally perpendicular to said lower grill unit; and a pair of control switches, each of which is operable so as to control actuation and cooking temperature of a respective one of said lower cooking members in said lower grill unit and said upper cooking member in a corresponding one of said upper halves;

wherein said connecting unit includes an intermediate pivot seat which is fixed and which extends upwardly from said rear side of said lower grill unit, and a pair of spaced apart left and right pivot seats fixed on said rear side of said lower grill unit and respectively spaced apart from two opposite sides of said intermediate pivot seat, each of said upper halves being pivoted to a respective one of said pivot seats and a respective one of said opposite sides of said intermediate pivot seat.

2. A grill device comprising:

a horizontal single-piece lower grill unit having a rear side and provided with two lower cooking members;

a horizontal upper grill unit in the form of two independent upper halves superposed on said lower grill unit so as to dispose each of said upper halves at a closed position with respect to said lower grill unit, each of said upper halves having a rear side and an upper cooking member which is registered with and which is electrically coupled to a respective one of said lower cooking members of said lower grill unit;

a connecting unit interconnecting said rear sides of said upper grill unit and said upper halves in such a manner that each of said upper halves can be turned rearward from said closed position to an open position, in which a respective one of said upper halves is generally perpendicular to said lower grill unit; and a pair of control switches, each of which is operable so as to control actuation and cooking temperature of a respective one of said lower cooking members in said lower grill unit and said upper cooking member in a corresponding one of said upper halves;

wherein said lower grill unit further includes an insulator spacer disposed between said lower cooking members so as to form two isolated cooking spaces that are confined by said upper halves and said lower cooking members.

3. The grill device as defined in claim 2, wherein said control switches are mounted on said upper halves, respectively.

4. The grill device as defined in claim 2, wherein said control switches are mounted on said lower grill unit at two sides of said insulator spacer.

* * * * *